United States Patent [19]
Oxel

[11] 3,976,000
[45] Aug. 24, 1976

[54] ROTATABLE AND VERTICALLY ADJUSTABLE RACK

[75] Inventor: Berton R. Oxel, Louisville, Ohio

[73] Assignee: The Hoover Company, North Canton, Ohio

[22] Filed: Feb. 27, 1975

[21] Appl. No.: 553,517

[52] U.S. Cl. .................................. 99/446; 126/338; 211/174
[51] Int. Cl.² ......................................... F24C 15/16
[58] Field of Search .......... 99/446; 126/337 A, 338; 211/102, 174

[56] References Cited
UNITED STATES PATENTS

| | | | |
|---|---|---|---|
| 504,836 | 9/1893 | Hinds | 126/338 |
| 944,757 | 12/1909 | Winterknight | 126/338 |
| 1,657,226 | 1/1928 | Neldner | 126/337 A |
| 1,961,391 | 6/1934 | Reedy et al. | 99/446 |
| 2,861,860 | 11/1958 | Zaidan | 126/338 |

*Primary Examiner*—Samuel B. Rothberg
*Assistant Examiner*—Richard R. Stearns

[57] ABSTRACT

In the preferred form the present invention is directed to a cavity having a side opening and a rack adapted so as to be rotatable between a position within the cavity and a position outside of the cavity. The rack is mounted on a threaded member having a vertical axis whereby rotation of the threaded member causes the rack to pivot between the two aforesaid positions and further rotation of the vertical adjustment member causes said rack to be vertically displayed with respect to the cavity.

6 Claims, 5 Drawing Figures

3,976,000

ROTATABLE AND VERTICALLY ADJUSTABLE RACK

BACKGROUND OF THE INVENTION

1. Field of the Invention

The present invention related to both the horizontal and vertical adjustment of a rack with respect to a cavity which is adapted to receive the rack. More particularly an appropriate environment would be an oven, refrigerator or the like and the rack would be suitable for receiving articles of food which are intended to be disposed within the cavity or chamber of such article. Manipulatable means are provided which cause pivoting of the rack with respect to the cavity to facilitate the entry or removal of food from the cavity and also provide a vertical adjustment of the rack to position the food in a desired vertical position with respect of the cavity.

2. Description of the Prior Art

Prior art is replete with teachings of a rack which is movable into or out of a cavity such as an oven or a refrigerator, some of these teachings having pivotal or rotatable racks. Furthermore, art of the same fields provide many teachings of vertical adjustable racks or shelves in a cavity. Much of this art, however, requires the rack be adjusted at vertically stepped intervals rather than providing infinite adjustment of height. the prior art also provides the teaching of a cooking rack which is both rotatable due to one manipulation and infinitely vertically adjustable due to another manipulation. Such a teaching is FIG. 9 of Schaar U.S. Patent 2,629,315. The structure of this teaching is somewhat complicated, would require more than one hand for vertical adjustment, and would be difficult to adjust when heated.

SUMMARY OF THE INVENTION

The present invention is directed to a vertically extending threaded member located in a cavity and directly or indirectly supporting a rack which is pivotal into and out of a cavity upon rotation of a manually operable adjustment means cooperating with a threaded member. Further rotation of the adjustment means causes vertical movement of the rack with respect to the cavity.

Another object of the present invention is to position the manually operable adjustment means for the threaded member outside of the cavity so that it is not subject to the conditions of the cavity. Therefore, manual operation of the adjustment means can occur whenever desired regardless of conditions within the cavity.

Another object is to movably position the rack with respect to a carrying bracket so that the rack may be removed to facilitate cleaning when desired.

Another object of the invention is to provide a pan which is positioned with respect to the rack so as to be movable therewith.

The foregoing and other advantages of the present invention will readily become apparent from a study of the following description and from the appendable drawings wherein a preferred embodiment of the invention is shown for purpose of illustration.

DETAILED DESCRIPTION OF THE PREFERRED EMBODIMENT

Figure 1:
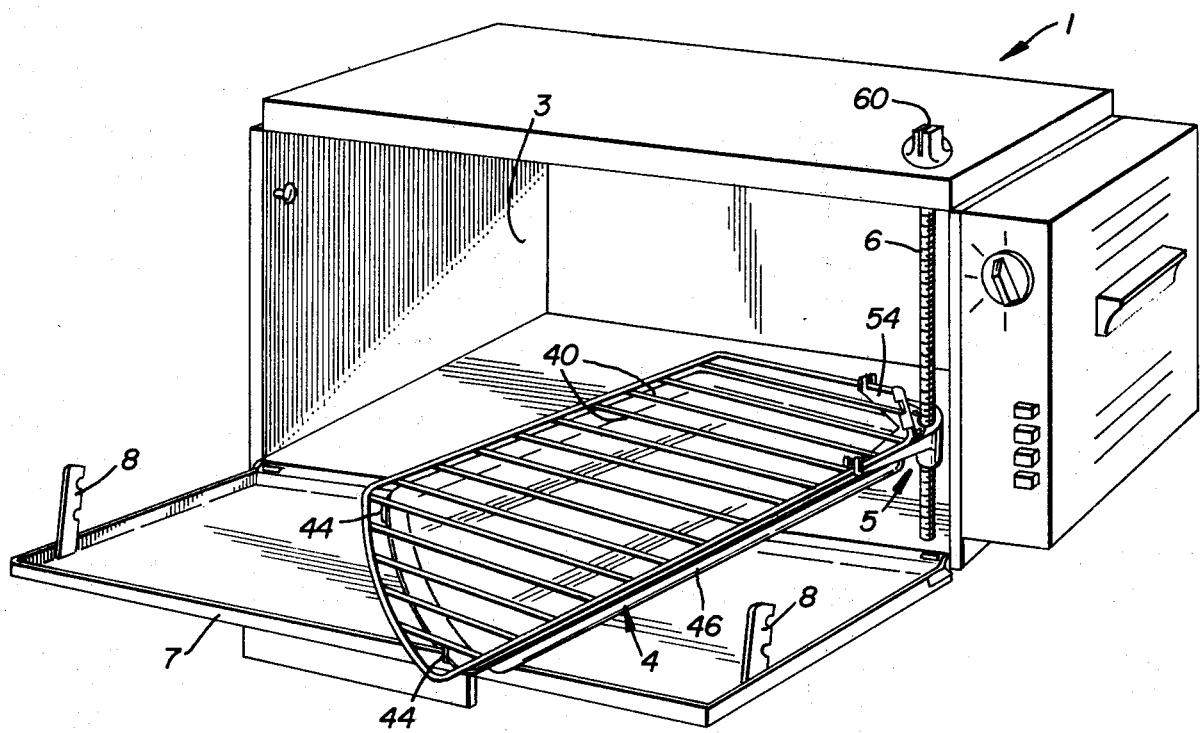
FIG. 1 is a perspective view of an oven utilizing a swing out food rack of the present invention.
Figure 2:
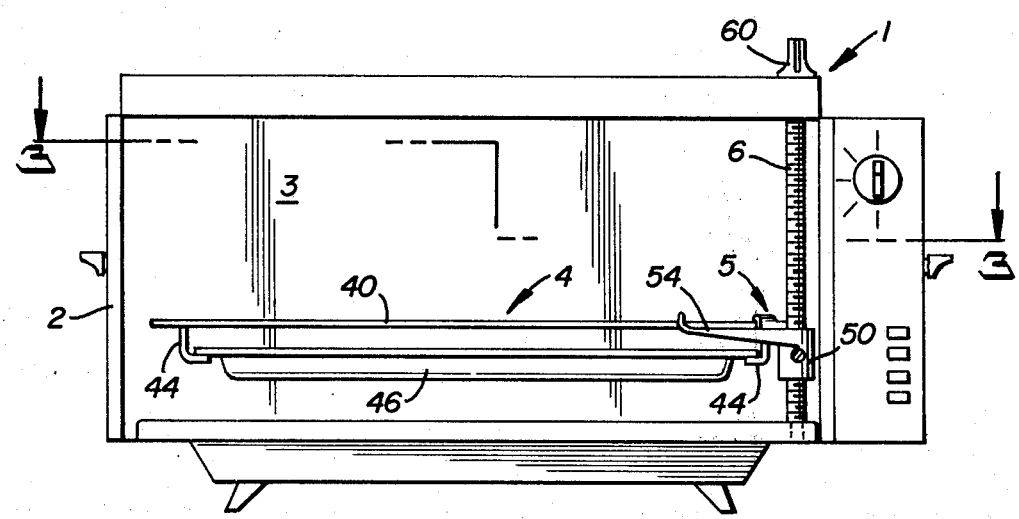
FIG. 2 is a front plan view of the oven of FIG. 1 with door removed and the food rack positioned within the oven.
Figure 3:
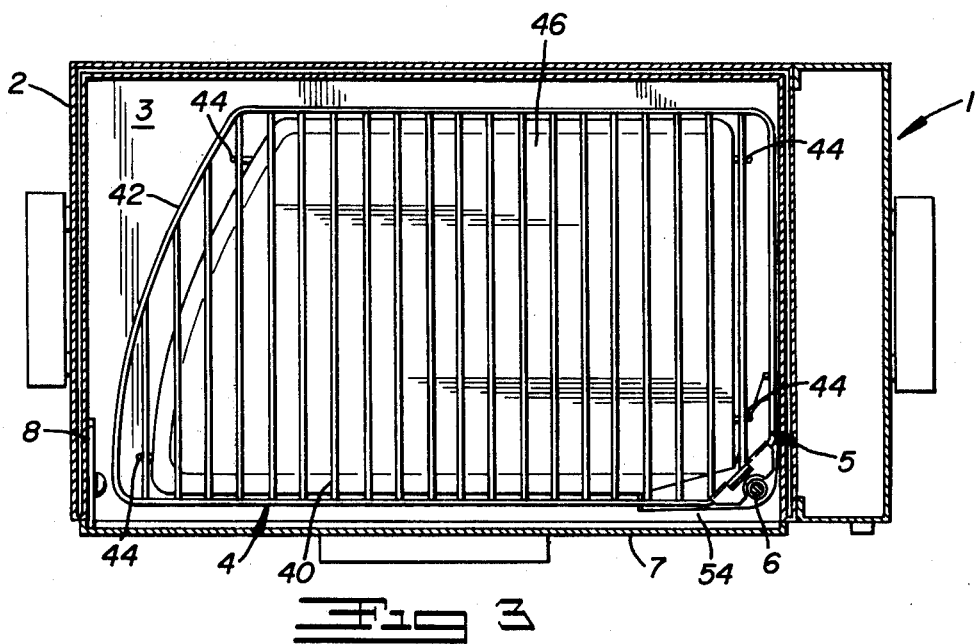
FIG. 3 is a vertical sectional view of the oven taken along lines 3—3 of FIG. 2.

With reference to FIGS. 1, 2 and 3 an electric domestic broiler-baker oven 1 is shown having a shell 2 which defines a front loading cooking cavity 3 having upper and lower heating elements (not shown). The present invention is directed to a food rack 4 which is adapted to be vertically adjustable with respect to the oven cavity, and also pivoted therewith whereby the rack may be positioned within the cavity or moved through the front opening to an external position. For purposes of selectively manipulating the food rack 4, the rack is mounted on a bracket 5 which in turn is supported by a vertical threaded member 6 both to be described in detail later.

The cooking cavity 3 of the oven has a forward facing opening. It is through the vertical plane of this opening that the food rack 4 swings into or out of the oven cavity 3 to facilitate loading and unloading thereof. As seen in FIGS. 1 and 3 the forward facing opening is provided with a door 7 which is quite common to ovens of this type and is not taught in specifics here. Oven doors of this type generally have a glass panel to facilitate viewing of the food during cooking and are hinged at the lower edge thereof, this lower hinge sometimes being displacable so that the oven door may be removed to facilitate cleaning of the oven cavity. Furthermore, the doors generally have latch means 8 at the upper edge thereof which cooperate with the oven to latch the door in a fully closed position during baking and in an ajar position during broiling. While the specific structure of the door is not a subject of the present invention doors of this general type are taught in Young 3,585,360 and Pirz 2,729,160.

The food rack 4 comprises a wire form 40 and has a forward corner adapted to be cantileverly mounted by the bracket 5. The opposite edge 42 of the wire form is curved so as to clear the side wall of the cooking cavity as the wire form is pivoted into and out of the cooking cavity 3. As seen in FIG. 2 the wire form 40 is provided with depending hook portions 44 which support a grease drip pan 46. The drip pan 46 is thus moved along with the wire form 40 and is therefore in position to catch drippings regardless of the position of the wire form 40. Drip pan 46 may be removed from the wire form 40 to facilitate cleaning thereof.

Figure 5:
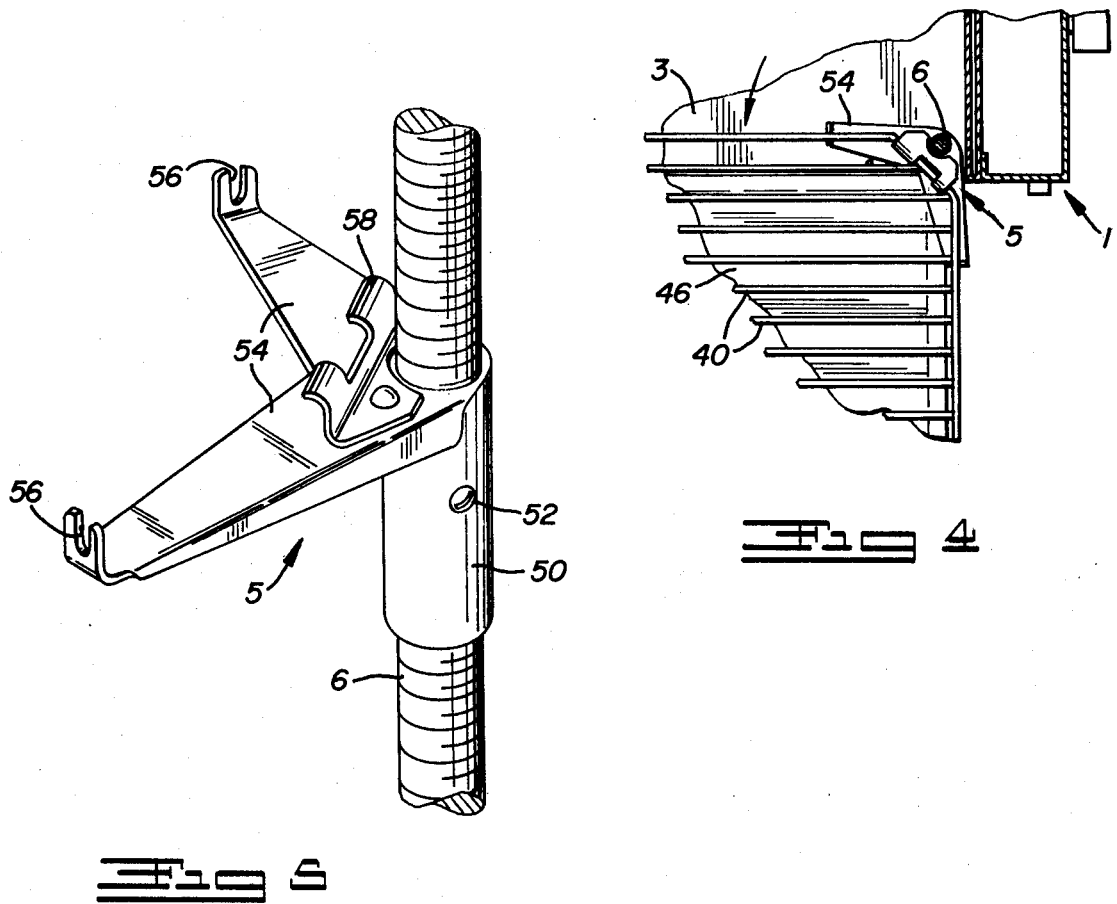
FIG. 5 is an enlarged perspective view of the bracket supporting the food rack.

The bracket 5 is best shown in the perspective view FIG. 5 and comprises a cylindrical body portion 50 which is adapted to receive and cooperate with the threaded member 6 by means of a set screw 52 which engages the external threads of member 6. The bracket 5 is also provided with two outwardly extending legs 54 which are spaced approximately 90° with respect to each other. The free end of each leg 54 is bent upwardly and provided with a slot 56 approximately the size of the wire forming the food rack 4. The bight portion of the bracket 5 connecting the two legs 54 is provided with an upwardly extending hook member 58.

One corner of the food rack 4 is inserted between the hook member 58 and the bight portion of the bracket 5. The food rack is then lowered so that adjacent side rails of the food rack enters the slots 56 of the leg portions 54. In this manner the food rack 4 is cantileverly mounted with respect to the bracket 5 as seen in FIG. 1.

Figure 4:
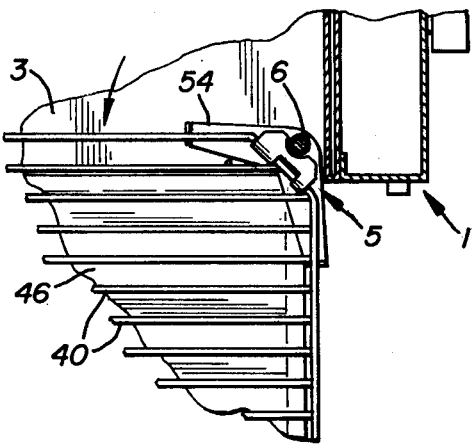
FIG. 4 is a broken portion of FIG. 3 with the food rack in an external position.

Located in a forward corner of the cooking cavity 3 is the vertically extending externally threaded member or screw 6 which is rotatably supported in bearings (not shown) in both the bottom and top walls of the shell 2, one of these bearings being a thrust bearing. The upper end of the screw 6 is provided with a rotatable member or knob 60 located externally of the cooking cavity 3. Manual rotation of the knob 60 provides rotation of the screw 6 which in turn provides both pivotal and vertical adjustment of the food rack 4 with respect to the cooking cavity 3. When the knob 60 is rotated clockwise the bracket 5, due to friction between the sleeve 50 and the threaded member 6, will be also rotated clockwise until the leg 54 or the adjoining edge of the rack 40 abut the internal side wall of the cavity 3 thus positioning the food rack within the cavity 3. Further clockwise rotation of the knob 60 will now impart a vertical movement to the bracket 5 and food rack 4 since the abutment of the food rack with the wall prevents further pivoting of the rack and thus overcomes the friction between the sleeve 50 and screw 6. In the same manner, when the knob 60 is rotated counterclockwise the food rack 4 will pivot counterclockwise either against the door 7 when in its latched position or to an exterior position shown in FIG. 4 where the bracket 5 again abuts the side wall and prevents further pivoting of the food rack. Further counterclockwise rotation of the knob 60 will now impart vertical movement of the rack in the opposite direction. The vertical adjustment of the food rack 4 is utilized to control the space between food placed thereon and the heater elements to adjust the heat imparted to the food.

In view of the foregoing, it will be apparent to those skilled in the art that I have accomplished at least the principal object of my invention and it will also be apparent to those skilled in the art that the embodiments herein described may be variously changed and modified without departing from the spirit of the invention. Furthermore, the invention is capable of uses and has advantages not herein specifically described, hence it will be appreciated that the hereindisclosed embodiments are illustrative only and that my invention is not limited thereto.

I claim:

1. A rack adjustment mechanism for a cabinet having a plurality of walls defining a chamber, the combination comprising a vertically disposed threaded member mounted for rotation with respect to said cabinet, a rotatable member mounted with respect to said cabinet to impart at least limited rotation to said threaded member, an object supporting rack carried by said threaded member for disposition within said chamber, said rack frictionally cooperating with said threaded member whereby rotation of said threaded member frictionally imparts rotation to said rack to horizontally displace an object supported by said rack with respect to said chamber, and said rack cooperates with a wall of said chamber to limit rotation of said rack whereby further rotation of said threaded member causes said rack to engage said wall to limit rotation of said rack and overcome the frictional cooperation between said rack and said threaded member to cause vertical shifting of said rack along the axis of said threaded member to vary the vertical position of an object supported by said rack with respect to said chamber.

2. The construction of claim 1 wherein said cabinet includes a substantially vertical opening providing access into said chamber and wherein said vertical member projects upwardly of said chamber and said rotatable member is located exteriorly of said chamber to facilitate rotation of said threaded member.

3. The construction of claim 2 wherein said vertically disposed threaded member is adjacent one edge of said access opening and wherein rotation of said rack about said threaded member provides movement of said rack and the supported object into and out of said chamber through said access opening.

4. The construction of claim 3 including a door provided for said access opening, said door when in a closed position cooperating with said rack to limit rotation of said rack.

5. The construction of claim 1 including means carried in part by said rack and means carried in part by said vertical member which cooperate to removably support said rack on said vertical member to facilitate removal of said rack for cleaning.

6. The construction of claim 1 wherein said rack has a drip pan supported therebelow whereby said drip pan maintains a juxtaposed relationship to the supported object on said rack during adjustment thereof.

* * * * *